Nov. 14, 1961   E. T. OLSON   3,008,498
SHEETBOARD CUTTING MACHINE
Filed Aug. 11, 1958   2 Sheets-Sheet 2

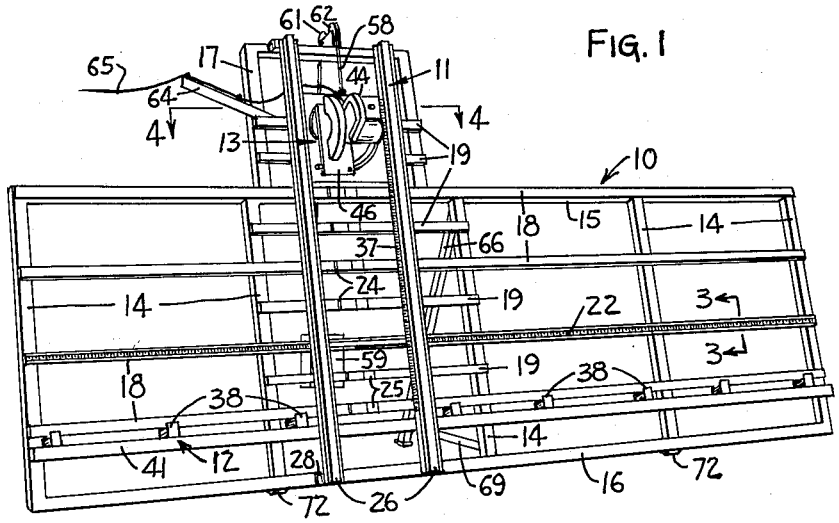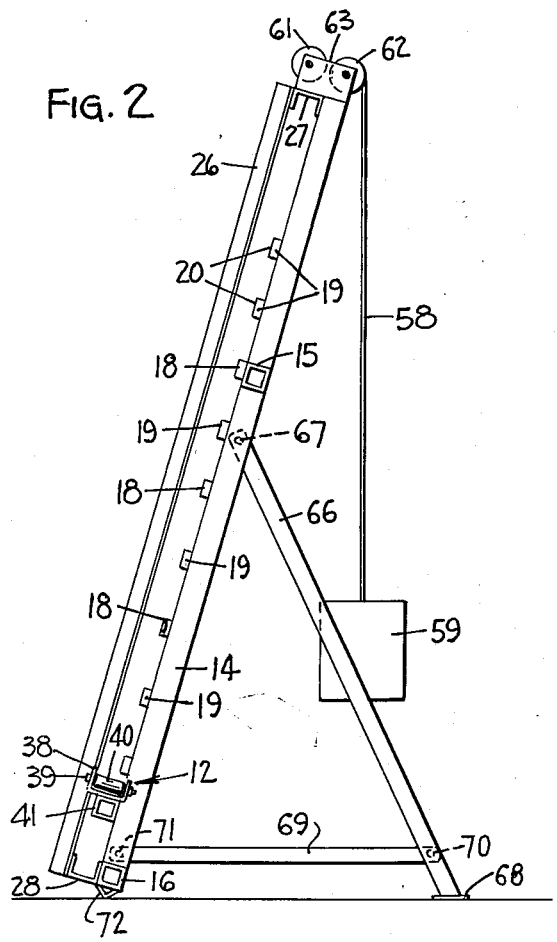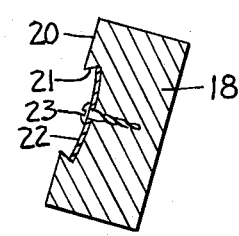

INVENTOR
EUGENE T. OLSON
BY Frederick C. Meyers
ATTORNEY

United States Patent Office 3,008,498
Patented Nov. 14, 1961

3,008,498
SHEETBOARD CUTTING MACHINE
Eugene T. Olson, 2905 Lincoln St. NE.,
Minneapolis, Minn.
Filed Aug. 11, 1958, Ser. No. 754,410
2 Claims. (Cl. 143—47)

This invention relates to cutting apparatus, and more particularly to a machine for cutting sheetboard material such as plywood.

In lumber yards, workshops, and on construction jobs, it often becomes necessary to cut plywood or other sheetboards into smaller pieces and sometimes to cut out material from the body portion of the sheets for window purposes and the like. The standard size of sheetboard is usually four feet by eight feet and may vary in thickness from one-eighth inch up to one inch. Such sheetboards usually have some flexibility and are difficult to handle because of their size and weight. Where a sheet is to be cut in a table saw by moving the workpiece relative to a sawblade, it sometimes becomes necessary for two or three workmen to handle and guide the sheet. If the workpiece is not precisely guided, or if it is accidentally raised from the saw table, there is danger of the sheet binding and becoming damaged.

It has been proposed that sheetboards of the character considered herein be disposed in upstanding relation with the sawblade adapted to cut vertically or horizontally while the board is supported by structural framework. Although it is easier to work with a sheetboard in upstanding relation, the movement thereof still presents a problem and the board must be moved slowly and regularly to make a smooth cut. Furthermore, the problem of chattering and jumping is still present whether or not the plywood is lying in a horizontal plane or in a vertical plane.

It is within the contemplation of the present invention and a general object thereof to provide a machine for cutting sheetboards which will operate smoothly and quickly in either horizontal or vertical direction to reduce the size of a sheet of material which normally is difficult to handle manually.

Another object of the invention is to provide apparatus with means for supporting a sheet of material such as plywood upon a frame equipped with roller mechanism in such a manner a to facilitate the guided movement thereof both in positioning a sheet and during cutting thereof.

A further object of the invention is to provide a mount for a portable electric saw which will be capable of precise securement with respect to a saw frame, the mount permitting the saw to be pivoted from a horizontal cutting position to a vertical position and vice versa.

These and other objects and advantages of the invention will more fully appear from the following description, made in connection with the accompanying drawings, wherein like reference characters refer to the same parts throughout the several views and in which:

FIGURE 1 is a perspective front view of my apparatus for cutting sheetboard;

FIGURE 2 is an enlarged side elevation of the apparatus taken from the right in FIGURE 1, the cutting mechanism being removed to better show the structure of the frame members;

FIGURE 3 is an enlarged section of a frame member carrying a linear scale taken on the line 3—3 of FIGURE 1;

Figure 4:
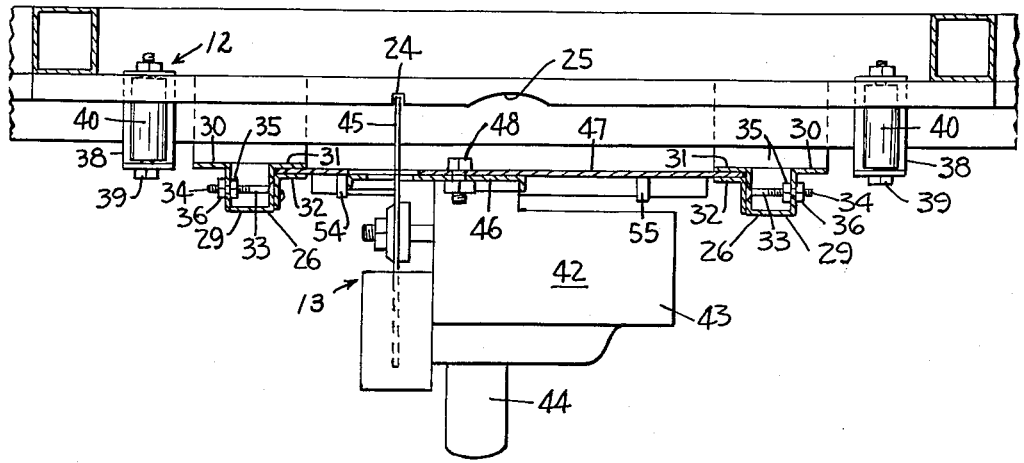
FIGURE 4 is an enlarged horizontal section of the intermediate portion of the device taken on the line 4—4 of FIGURE 1 and looking in the direction of directional arrows.

With continued reference to the drawings, the apparatus for cutting sheetboard is shown in its entirety in FIGURE 1. The apparatus comprises generally an upright backing frame 10, a guide frame 11, roller means 12 and a power cutting mechanism 13. Sheetboard such as plywood is placed edgewise upon the roller means 12 while leaning flatly against the backing frame 10 and is then positioned by rolling it forward between the backing frame 10 and the guide frame 11. The power cutting mechanism 13 may be oriented so as to cut vertically through the sheetboard or may be pre-positioned for horizontal cutting with the sheetboard being advanced on the rollers and in contact with the backing frame.

More specifically, the backing frame 10 is composed of a plurality of spaced channel bars 14 secured to horizontal top and bottom bars 15 and 16. Secured to the upper bar 15 is a U-shaped frame member 17 lying in the same plane with the bars 14—16. A plurality of horizontal slats 18 are secured forwardly of the vertical bars 14 and all present a forwardly facing planar surface as shown in FIGURE 2. Also secured between two of the uprights bars 14 and across the U-shaped frame 17 are a plurality of shorter slats 19, each of which has a forwardly facing surface 20 lying in the same planar surface. When a sheetboard is placed against the backing frame 10, it will contact the horizontal slats and be capable of movement thereagainst while lying substantially in the same planar surface. One of the horizontal slats 18 may be longitudinally recessed at 21 so as to receive a tape or rule 22 for linear measurement. The rule 22 may be secured to the slat by a plurality of spaced fasteners such as screws 23 (FIG. 3).

Each of the short slats 19 and long slats 18 are provided with recessed pathways 24 and 25 cut into the surface 20 of the slats 18 and 19 so as to permit movement of the power cutting mechanism 13 in intersecting fashion with respect to the planar surface of the backing frame as will be subsequently described.

The guide frame 11 consists of a pair of rails 26 which are secured to spacer members 27 and 28 at the respective upper and lower ends thereof. The spacers 27 and 28 are also secured to the U-frame 17 and bottom bar 16 of the backing frame 10. The rails 26 are thus positioned in spaced parallel relation confronting the forwardly facing surface defined by the slats 18 and 19. The space is designed to permit the thickest sheetboard to be cut to slide between the rails and the backing frame.

Figure 5:
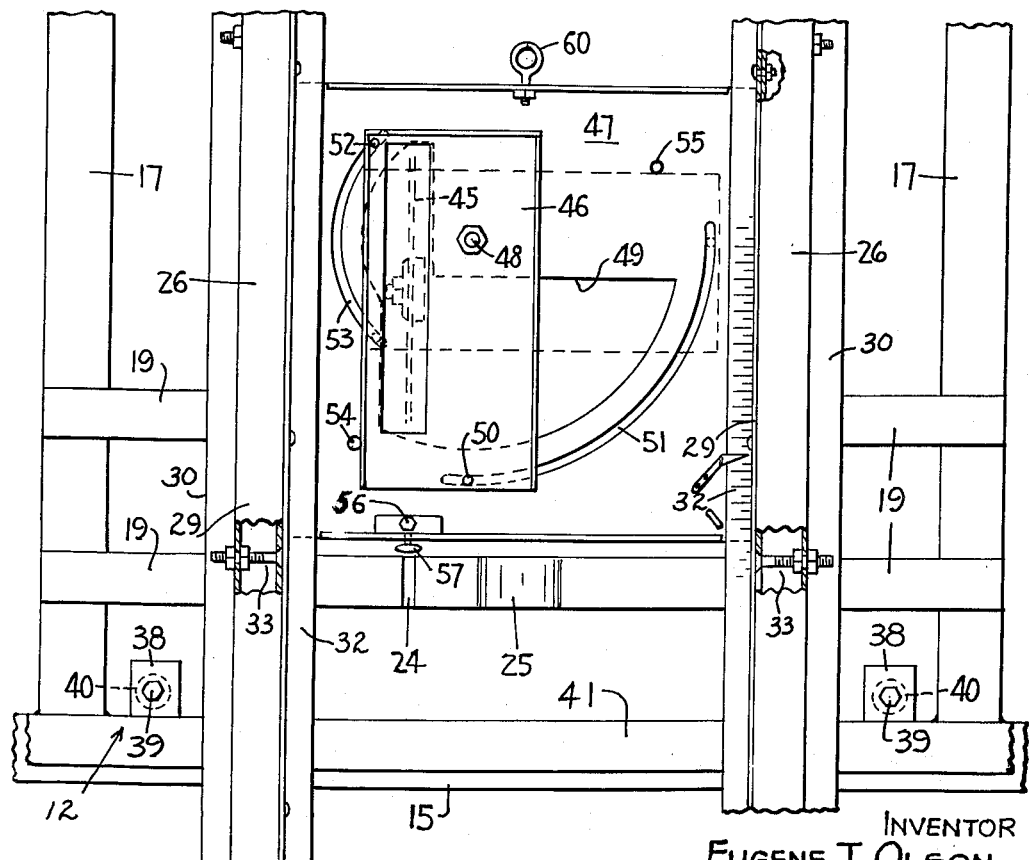
FIGURE 5 is a front view of the mounting plate for a portable saw and the guide frame therefor, the motor and rotary cutting element being removed and portions of the view cut away to better show the structure thereof.

The guide rails 26 have channel portions 29 with outwardly extending marginal flanges 30 and 31 respectively. An angle iron 32 is secured to the channel portion 29 of each rail 26 so as to lie in closely spaced relation with the respective flanges 31 and to define cooperatively a sliding mount for the power cutting mechanism 13. Bolts 33 extend through the channel portions 29 and are provided with threaded ends 34 which, in turn, have respective inside nuts 35 and outside nuts 36, as shown in FIGURE 4. By adjusting the relative positions of nuts 35 and 36 and drawing them up tightly against the channel member 29, the rails may be precisely sprung to adjusted position to provide true and accurate guiding means for the power cutting mechanism. One of the rails may be provided with a vertical linear scale 37 which may be imprinted or superposed thereon as shown in FIGURES 1 and 5.

An important feature of the present invention resides in the horizontal roller means 12 which makes it possible to move a sheetboard horizontally while maintaining precise contact with the backing frame 10. The roller means utilizes a plurality of brackets 38, each provided with an axial bolt 39 and a roller 40 rotatably mounted thereon. The rollers 40 are horizontally spaced on a bar 41 so as to lie straightly aligned between the backing frame 10 and the guide frame 11 adjacent the lower margins thereof. The rollers 40 intersect the planar surface defined by the forward surface 30 of slats 18 and 19 and, hence, exert no frictional drag upon the lower edge of a sheetboard when positioned thereon.

The power cutting mechanism comprises a conventional portable electric power saw 42 having a motor 43, a handle 44 and a rotatable cutting blade 45 as shown in FIGURE 4. Also forming a part of the power tool is the base 46 which, in normal independent usage of the power tool, is intended to contact the surface of a board to be cut. In the instant arrangement, however, the portable power tool is pivotally mounted upon a mounting plate 47, the pivoting being effected by a nut and bolt assemblage 48 passing through the base 46 and the mounting plate 47 at the position indicated in FIGURES 4 and 5. An irregularly shaped opening 49 is cut through the mounting plate 47 so as to receive at all times the rotatable cutting blade 45 as shown in FIGURE 5. A guide pin 50 is secured to the base plate 46 and is adapted to be received in an arcuate slot 51 cut in the mounting plate 47, as shown in FIGURE 5. Similarly, a guide pin 52 is also secured to the base plate 46 and adapted to extend through a smaller arcuate slot 53 cut in the mounting plate 47 at a shorter radius from the pivot 48. The respective arcuate slots 51 and 53 are positioned concentrically with respect to the pivot 48 so as to hold the power tool base 46 in firm guided relation whether in the full line position of FIGURE 5 for vertical cutting or when swung to the horizontal cutting position represented by dotted lines in the same view. An upstanding stop member 54 secured to mounting plate 47 determines the limit of swing of the power tool 13 and its base 46 in swinging to upper or horizontal cutting position. During the swinging movement, it will be observed that the cutting blade 45 at all times maintains clearance with the plate 47 and is retained within the irregularly shaped opening 49.

An abutment pin 56 is threadably mounted through the mounting plate 47 and may be adjustably secured by means of locking screw 57. The abutment pin 56 is adapted to lightly contact the forward surface of a sheetboard and to prevent the board from chattering or binding during the cutting operation. It is understood that the pin may be adjusted for such light contact irrespective of the thickness of the sheetboard.

The mounting plate 47 is slidable together with the power saw 42 in mounted relation on the rails 26, as shown in FIGURES 4 and 5, and may be counter-balanced as shown in FIGURES 1 and 2 by means of a flexible line 58 secured to a weight 59 at one end and secured to an eye-hook 60, in turn rigidly secured to the mounting plate 47. The line 58 is trained over a pair of pulleys 61 and 62 journalled in a bracket 63, as shown in FIGURES 1 and 2. The counter-balance weight 59 weighs approximately the same as the mounted power tool assemblage 13 and hence can be easily moved in sliding relation between rails 26 with a minimum of effort. An arm 64 (FIG. 1) secured to the U-frame 17 is adapted to support an electrical cord 65 which leads to, and powers, the motor 43 of the portable electric saw. The entire frame structure and power cutting mechanism is supported in easel fashion by rearwardly extending leg 66 pivotally mounted at 67 to the bar 14 and terminating downwardly in a foot 68 as shown in FIGURE 2. A rearward brace 69 is secured rearwardly at 70 to the leg 66 and is secured forwardly at 71 to the same upright bar 14. Fulcruming members 72 are mounted underneath the lower bar 16 so as to provide for easy tilting of the backing frame 10 to acquire a convenient working angle.

The use and operation of my apparatus will be readily understood from the foregoing description. Sheetboard material is placed edgewise upon the roller assemblage 12, lying also in flat contact with the planar surface defined by the slats 18 and 19. The sheetboard may then be moved to proper position with respect to the tape or rule 22 whereupon the power cutting mechanism 13 is oriented to the full line position shown in FIGURE 5. With power applied, the cutting mechanism is pulled vertically with the cutting blade 45 sawing the sheetboard along a vertical line. The circumferential portion of the blade 45 passes through the planar surface of the backing frame 10 and is received in the pathway 24 recessed into each of the short slats 19 in straight alignment. The saw thus makes a clean and positive cut while the sheetboard lies against the backing frame. The abutment pin 56 lies in close clearance or light contact with the sheetboard during the cut so as to prevent chattering or binding.

With a sheetboard retracted, the portable saw 42 is swung to the dotted line portions of FIGURE 5 and into contact with the stop pin 55. Guide pins 50 and 52 may be clamped in their respective arcuate slots 51 and 53 to hold the portable electric saw in its horizontal position. The power cutting mechanism 13 is then lowered in its entirety with the cutting blade 45 now lying in parallel relation with the horizontal slats 18 and 19. Each of the slats has an arcuate recess 25 (FIG. 14) defining a pathway which again permits the blade 45 to intersect the planar surface of the backing frame 10. When the proper vertical position has been attained, a sheetboard may be moved horizontally in edge contact with the roller assemblage 12 and a horizontal cut effected for the distance desired. Scale 37 may be employed to determine the vertical positioning of the cutting mechanism 13.

It will, of course, be understood that various changes may be made in the form, details, arrangements and proportions of the parts without departing from the scope of my invention as set forth in the appended claims.

What I claim is:

1. In apparatus for cutting sheetboard wherein the sheetboard is supported edgewise in an upstanding plane, a guide frame mounted in close parallel relation across the width of the plane, a mounting plate having parallel vertical side edges slidably received in said guide frame, an electric portable saw having a circular blade and a fixed base plate pivotally mounted against said mounting plate on an axis lying in spaced parallel relation to said blade, said mounting plate having an opening for receiving the blade of said portable saw in all angular positions from horizontal to vertical, and means locating horizontal and vertical pivoted positions respectively for said portable saw, the angular shifting thereof being accomplished without removing the blade thereof from said opening, said means constituting a pair of arcuate slots in the mounting plate and a pair of guide pins affixed to said base plate, said pins respectively lying within and being guided by said arcuate slots, the ends of said slots providing respective abutments for said pins when said porable saw is pivoted just past one of said horizontal and vertical positions.

2. In apparatus for cutting sheetboard wherein the sheetboard is supported edgewise in an upstanding plane, a guide frame mounted in close parallel relation across the width of the plane, a plurality of rollers horizontally aligned on said frame for supporting said sheetboard, a mounting plate having parallel vertical side edges slidably received in said guide frame, an electric portable saw having a circular blade and a fixed base plate pivotally mounted against said mounting plate on an axis lying in spaced parallel relation to said blade, said mounting plate having an opening for receiving the blade of said portable saw in all angular positions from horizontal to vertical, and means locating horizontal and vertical pivoted positions respectively for said portable saw, the angular shifting thereof being accomplished without removing the blade thereof from said opening, said means constituting a pair of arcuate slots in the mounting plate and a pair of guide pins affixed to said base plate, said pins respectively lying within and being guided by said arcuate slots, the ends of said slots providing respective abutments for said pins when said portable saw is pivoted just past one of said horizontal and vertical positions.

References Cited in the file of this patent

UNITED STATES PATENTS

| | | |
|---|---|---|
| 1,133,443 | Martin | Mar. 30, 1915 |
| 1,136,181 | Burgess | Apr. 20, 1915 |
| 1,852,193 | Schneider | Apr. 5, 1932 |
| 2,347,359 | Miller | Apr. 25, 1944 |
| 2,818,892 | Price | Jan. 7, 1958 |
| 2,833,320 | Bennett | May 6, 1958 |